(12) United States Patent (10) Patent No.: US 12,666,001 B2

Zou (45) Date of Patent: Jun. 23, 2026

(54) IMMERSIVE CRYSTAL BALL 3D VISUAL PROJECTION DEVICE

(71) Applicant: Guangdong Yiyahui Technology Co., Ltd., Huizhou (CN)

(72) Inventor: Wenyi Zou, Meizhou (CN)

( * ) Notice: Subject to any disclaimer, the term of this patent is extended or adjusted under 35 U.S.C. 154(b) by 0 days.

(21) Appl. No.: 19/533,257

(22) Filed: Feb. 8, 2026

(65) Prior Publication Data

US 2026/0172541 A1     Jun. 18, 2026

(51) Int. Cl.
| | |
|---|---|
| *H04N 13/388* | (2018.01) |
| *H04N 7/06* | (2006.01) |
| *H04N 13/194* | (2018.01) |
| *H04N 13/398* | (2018.01) |

(52) U.S. Cl.
CPC ............. *H04N 13/388* (2018.05); *H04N 7/06* (2013.01); *H04N 13/194* (2018.05); *H04N 13/398* (2018.05)

(58) Field of Classification Search
CPC .. H04N 13/388; H04N 13/194; H04N 13/398; H04N 7/06
USPC .......................................................... 348/43
See application file for complete search history.

(56) References Cited

U.S. PATENT DOCUMENTS

| | | | |
|---|---|---|---|
| 9,218,116 B2 * | 12/2015 | Benko ................... | G06F 3/0486 |
| 10,025,549 B1 | 7/2018 | Welck | |
| 10,806,996 B2 | 10/2020 | Frisco | |

| | | | |
|---|---|---|---|
| 2007/0264618 A1 * | 11/2007 | Fuller .................... | G09B 27/08 |
| | | | 434/131 |
| 2011/0037952 A1 * | 2/2011 | LaDuke ................. | G03B 21/26 |
| | | | 353/28 |
| 2011/0211256 A1 * | 9/2011 | Connor ................ | G09G 3/3473 |
| | | | 359/463 |
| 2015/0288914 A1 * | 10/2015 | Minneman ............ | G09F 27/005 |
| | | | 348/552 |
| 2017/0053563 A1 * | 2/2017 | Holloway ............... | G09B 23/28 |
| 2018/0139420 A1 * | 5/2018 | Liu ....................... | H04N 9/3185 |
| 2019/0037182 A1 * | 1/2019 | Kasahara ............... | G03B 37/04 |
| 2020/0043408 A1 * | 2/2020 | Foody ................... | G09G 3/3225 |
| 2021/0361105 A1 * | 11/2021 | Piccionelli ........... | H05B 47/155 |
| 2023/0267855 A1 * | 8/2023 | Kim ........................ | G09B 27/08 |
| | | | 434/288 |
| 2024/0069424 A1 * | 2/2024 | Martire .................. | G03B 21/28 |
| 2024/0188404 A1 * | 6/2024 | Yamazaki .............. | H10K 59/95 |

* cited by examiner

*Primary Examiner* — Matthew David Kim

(74) *Attorney, Agent, or Firm* — Sam Pierce

(57) ABSTRACT

An immersive crystal ball 3D visual projection device is provided, including: a hemisphere body serving as the projection image carrier, featuring a mounting surface and an outer spherical surface; a mounting base with a hemispherical hollow shell structure, connecting with the hemisphere body to form a complete sphere; wherein the mounting base includes a mounting cavity housing a display screen and a control unit, with the display screen's viewing surface facing the mounting surface to project images within the hemisphere body, enabling external observers to view the projected images through the outer spherical surface; and the control unit includes a display control board and a power control board, the display control board is electrically connected to the display screen to transmit image signals to it; the power control board is connected to a battery and is electrically linked to the display control board for power distribution and information exchange.

16 Claims, 4 Drawing Sheets

IMMERSIVE CRYSTAL BALL 3D VISUAL PROJECTION DEVICE

FIELD

The present disclosure relates to the technical field of projection equipment, specifically to an immersive crystal ball 3D visual projection device.

BACKGROUND

With the advancement of science and technology and the increasing demand for quality of life, digital photo frames—as electronic devices capable of flexibly displaying digital images—have been widely adopted in scenarios such as home decoration and gift-giving. Most existing digital photo frames adopt a flat rectangular structure, with key components including a display screen, casing, mainboard, and power supply. Images are presented directly through the display screen, allowing manual or automatic switching based on user preferences. While this addresses the limited display format of traditional paper photo frames, there remains significant room for improvement in visual presentation and aesthetic appeal.

To enhance the visual experience, several improvement directions have emerged in existing technologies for digital photo frames. On one hand, some digital photo frames enhance display effects through transparent substrates, backlighting technology, or 3D displays. For instance, transparent floating digital photo frames use three layers of tempered glass with backlighting to achieve a floating image effect, reducing the bulkiness of traditional electronic screens. Alternatively, ordinary 2D displays are replaced with 3D displays to present images in a stereoscopic format. On the other hand, other technologies attempt to create a sense of depth by introducing a gap between the transparent cover plate and the image. Alternatively, structures such as reflective layers or patterned layers are added to the transparent substrate to evoke an atmospheric feel within a three-dimensional space.

Overall, existing digital photo frames exhibit the following shortcomings:

1. Traditional digital photo frames feature monotonous designs, predominantly rectangular flat structures, resulting in poor visual presentation and an inability to achieve the immersive atmosphere provided by 3D display effects;
2. Existing digital photo frames with 3D effects mostly rely on dedicated 3D displays to achieve stereoscopic effects or employ other methods to create spatial ambiance. These approaches are costly, structurally complex, and offer users a relatively limited visual experience.

SUMMARY

The present disclosure provides an immersive crystal ball 3D visual projection device to overcome the limitations of current models.

According to some embodiments of the present disclosure, an immersive crystal ball 3D visual projection device is provided, which is design for displaying digital images, including: a hemisphere body serving as the projection image carrier, featuring a mounting surface and an outer spherical surface; a mounting base with a hemispherical hollow shell structure, connecting with the hemisphere body to form a complete sphere; wherein the mounting base includes a mounting cavity housing a display screen and a control unit, with the display screen's viewing surface facing the mounting surface to project images within the hemisphere body, enabling external observers to view the projected images through the outer spherical surface; and the control unit includes a display control board and a power control board, the display control board is electrically connected to the display screen to transmit image signals to it; the power control board is connected to a battery and is electrically linked to the display control board for power distribution and information exchange; the power control board manages battery power allocation and controls charge/discharge logic.

Furthermore, the mounting cavity is provided with a mounting opening, and the edge of the mounting opening is provided with a sealing groove, wherein the sealing groove is used to fill with sealant to seal and bond the hemisphere body and the mounting base.

Furthermore, a speaker is installed within the mounting cavity, and the display control board is electrically connected to the speaker, enabling the display control board to transmit audio signals to the speaker; the mounting base is provided with a plurality of speaker holes corresponding to the speaker, allowing sound from the speaker to be transmitted through the speaker holes to the exterior of the mounting cavity.

Furthermore, the mounting cavity is provided with a positioning base, the positioning base is formed with a positioning hole, and the display control board is formed with a connecting hole corresponding to the positioning hole, such that after a fastener is inserted through the connecting hole and the positioning hole, the display control board can be locked onto the positioning base.

Furthermore, two positioning bases are provided, each featuring a snap-fit groove, and the two snap-fit grooves are arranged oppositely, with the power control board inserted between them.

Furthermore, the display control board is equipped with control buttons that generate electrical signals when pressed, enabling users to interact with the display control board via the control buttons; the mounting base is provided with keyholes corresponding to the control buttons, wherein keycaps are installed in the keyholes and connected to the corresponding control buttons.

Furthermore, the power control board is provided with an interface module for connecting to a power cord, and the mounting base is provided with a charging port, wherein the interface module corresponds to the charging port.

Furthermore, a dust cover is provided between the display screen and the display control board, and the dust cover is configured to seal the mounting cavity.

According to some embodiments of the present disclosure, an immersive crystal ball 3D visual projection device is provided, which is designed for displaying digital images, including: a hemisphere body and a hemispherical mounting base, which interlock to form a complete sphere; wherein the mounting base features a mounting cavity, and the mounting cavity houses a display screen and a control unit; the display screen receives image signals from the control unit and projects the images onto the hemisphere body, and the hemisphere body are made of crystal material to refract light passing through them; a battery installed within the mounting cavity, electrically connected to the control unit to distribute electrical energy and manage charge/discharge logic; a speaker installed within the mounting cavity, electrically connected to the control unit to transmit audio signals.

Furthermore, the control unit includes a display control board and a power control board, the display control board is electrically connected to the display screen to transmit image signals thereto, while the power control board is electrically connected to the display control board for power distribution and information exchange.

Furthermore, the mounting cavity is provided with a mounting opening, and the edge of the mounting opening is provided with a sealing groove, wherein the sealing groove is used to fill with sealant to seal and bond the hemisphere body and the mounting base.

Furthermore, a speaker is installed within the mounting cavity, and the display control board is electrically connected to the speaker, enabling the display control board to transmit audio signals to the speaker; the mounting base is provided with a plurality of speaker holes corresponding to the speaker, allowing sound from the speaker to be transmitted through the speaker holes to the exterior of the mounting cavity.

Furthermore, the mounting cavity is provided with a positioning base, the positioning base is formed with a positioning hole, and the display control board is formed with a connecting hole corresponding to the positioning hole, such that after a fastener is inserted through the connecting hole and the positioning hole, the display control board can be locked onto the positioning base.

Furthermore, two positioning bases are provided, each featuring a snap-fit groove, and the two snap-fit grooves are arranged oppositely, with the power control board inserted between them.

Furthermore, the display control board is equipped with control buttons that generate electrical signals when pressed, enabling users to interact with the display control board via the control buttons; the mounting base is provided with keyholes corresponding to the control buttons, wherein keycaps are installed in the keyholes and connected to the corresponding control buttons.

Furthermore, the power control board is provided with an interface module for connecting to a power cord, and the mounting base is provided with a charging port, wherein the interface module corresponds to the charging port.

Furthermore, a dust cover is provided between the display screen and the display control board, and the dust cover is configured to seal the mounting cavity.

BRIEF DESCRIPTION OF THE DRAWINGS

The accompanying drawings are provided to facilitate further understanding of the present disclosure and form part of the present disclosure. The illustrative embodiments and their descriptions are intended to explain the present disclosure and do not constitute undue limitations thereof. In the drawings.

Figure 1:
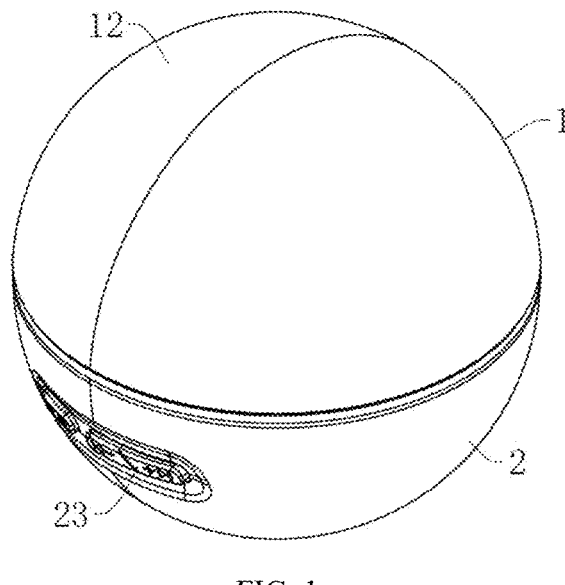
FIG. 1 shows the overall structural schematic of the immersive crystal ball 3D visual projection device according to some embodiments, first perspective.
Figure 2:
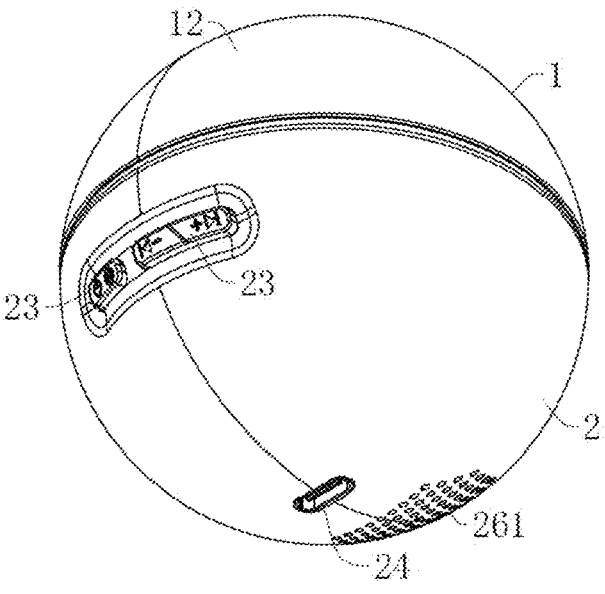
FIG. 2 shows an overall structural schematic of the immersive crystal ball 3D visual projection device according to some embodiments, second perspective.
Figure 3:
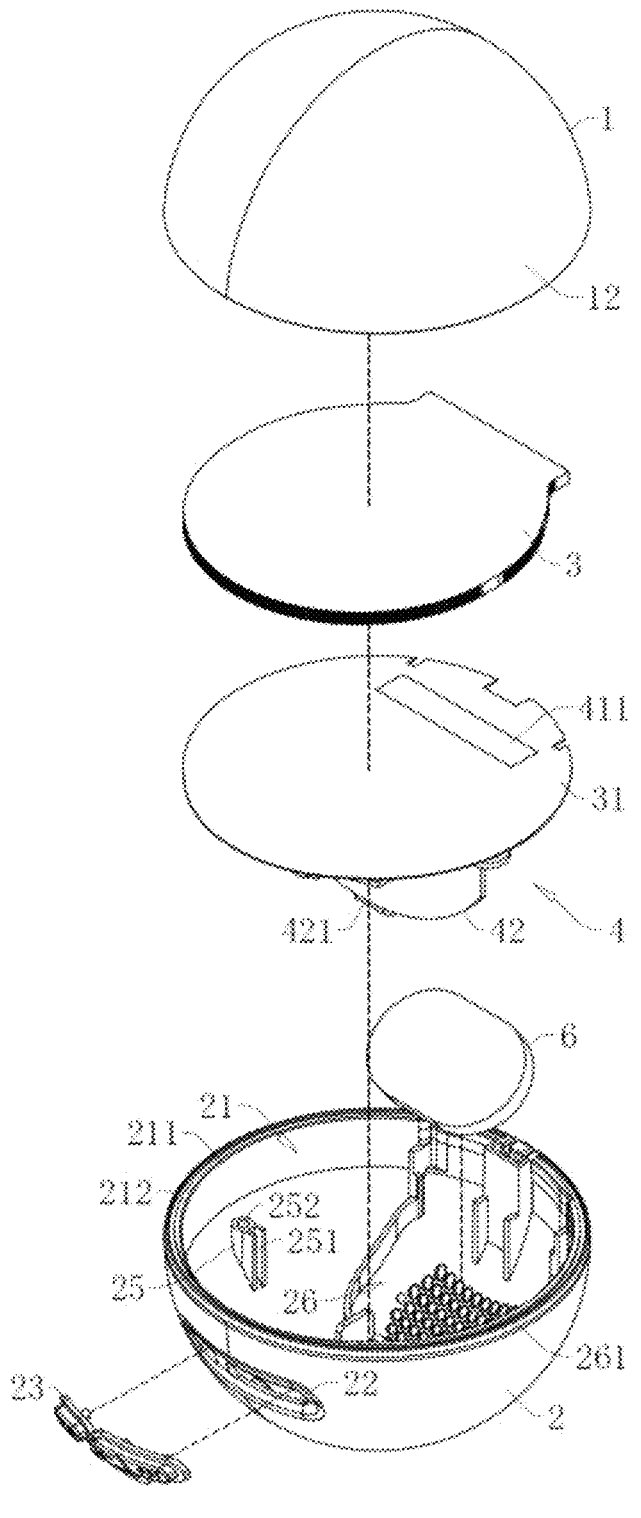
FIG. 3 shows an exploded view of the immersive crystal ball 3D visual projection device according to some embodiments, first perspective.
Figure 4:
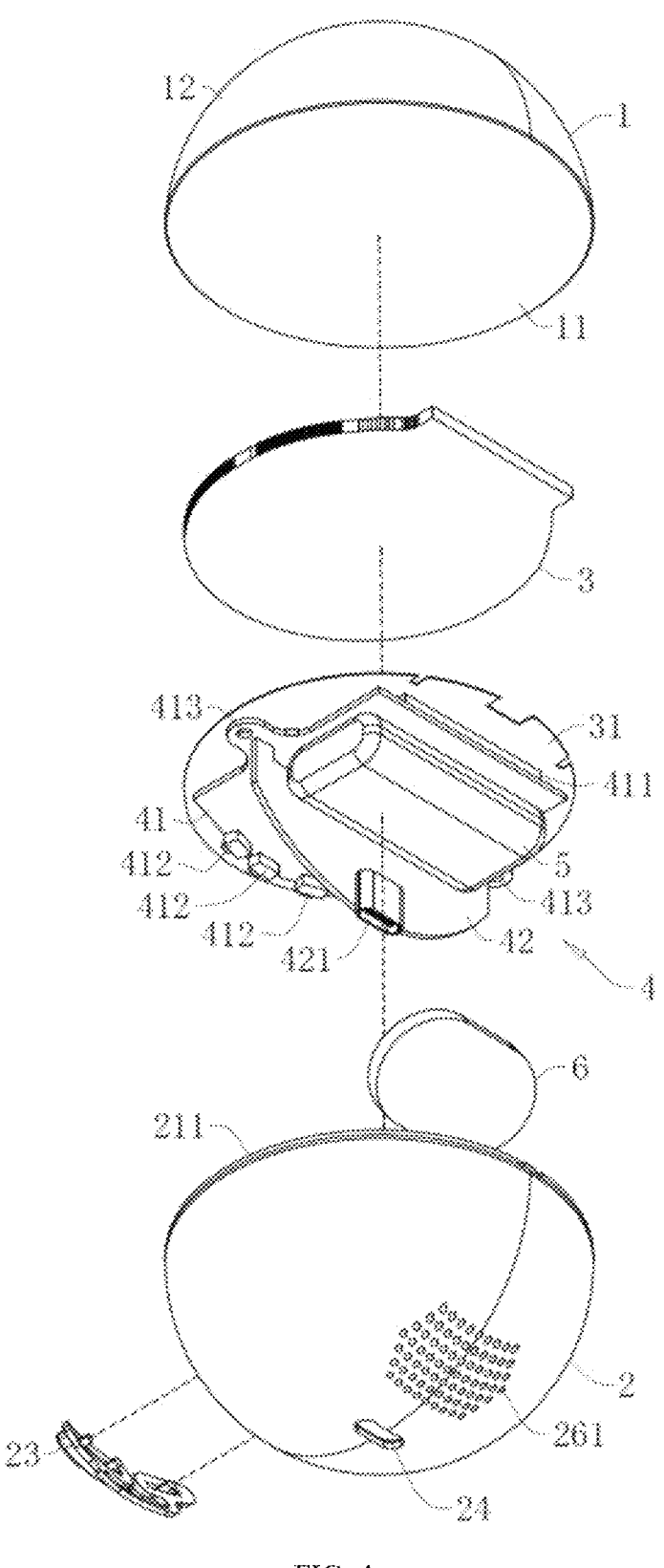
FIG. 4 shows an exploded view of the immersive crystal ball 3D visual projection device according to some embodiments, second perspective.
Figure 5:
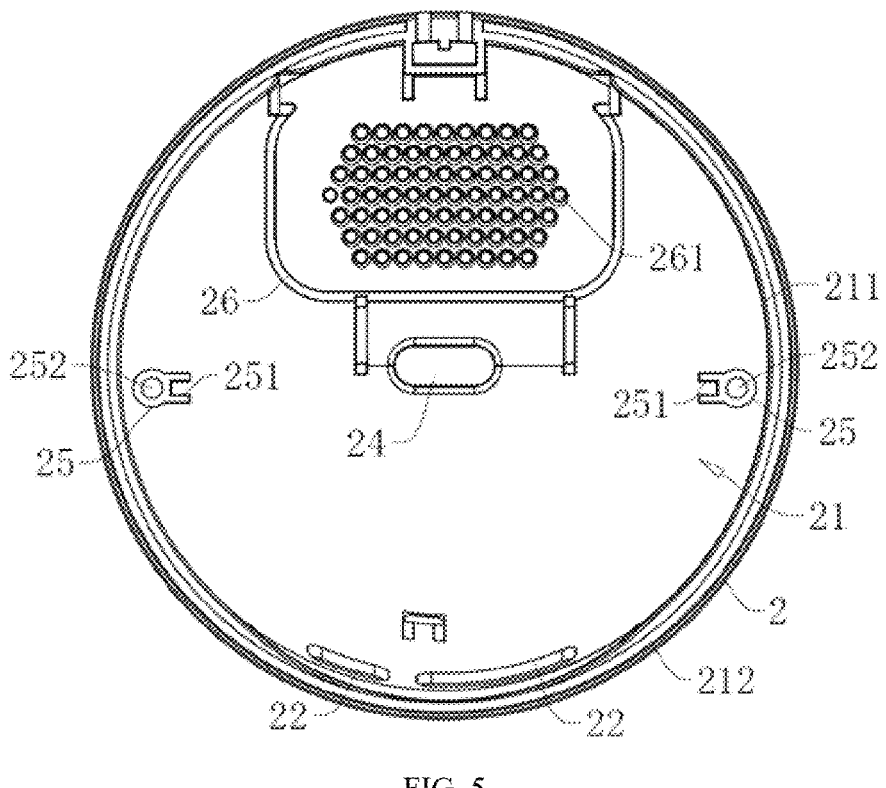
FIG. 5 shows a top view of the mounting base according to some embodiments.

REFERENCE SIGNS 1. hemisphere body; 11. mounting surface; 12. outer spherical surface;
2. mounting base; 21. mounting cavity; 211. mounting opening; 212. sealing groove; 22. keyhole; 23. keycap; 24. charging port; 25. positioning base; 251. snap-fit groove; 252. positioning hole; 26. accommodation slot; 261. speaker hole;
3. display screen; 31. dust cover;
4. control unit; 41. display control board; 411. display connector; 412. control button; 413. connection hole; 42. power control board; 421. interface module;
5. battery; 6. speaker.

DETAILED DESCRIPTION

To further illustrate the content, features, and efficacy of the present disclosure, the following embodiments are provided and described in detail with reference to the accompanying drawings:

Embodiment 1

This embodiment discloses an immersive crystal ball 3D visual projection device for displaying digital images and presenting stereoscopic visual effects. The projection device includes a hemisphere body 1 and a mounting base 2, which are interlocked together. The hemisphere body 1 serves as the projection image carrier, featuring an outer spherical surface 12, and a mounting surface 11 facing the mounting base 2. The mounting surface 11 is a circular plane. The hemisphere body 1 is preferably made of crystal material. During production, by adjusting its material composition and dimensions, the hemisphere body 1 enables light entering from the mounting surface 11 to produce specific refraction angles, optical magnification, and 3D visual presentation effects. The mounting base 2 is a hemispherical hollow shell structure. Its inner cavity forms a hemispherical mounting cavity 21 and includes a mounting opening 211 facing the mounting surface 11 of the hemisphere body 1. When the hemisphere body 1 and the mounting base 2 are connected, the edge of the mounting surface 11 of the hemisphere body 1 fits against the edge of the mounting opening 211, thereby sealing the mounting cavity 21. The two components are fixedly connected in a removable manner via a sealing structure.

When the projection device is in use, the hemisphere body 1 is positioned above the mounting base 2. To ensure a tight connection between the hemisphere body 1 and the mounting base 2, a sealing groove 212 is formed along the edge of the mounting opening 211 on the mounting base 2. The sealing groove 212 encircles the mounting opening 211 circumferentially. This sealing groove 212 can be filled with sealant or fitted with an adhesive annular sealing component. When the hemisphere body 1 snaps onto the mounting opening 211, this sealing component bonds the hemisphere body 1 and mounting base 2 together, forming a tightly connected sphere. The mounting cavity 21 houses a display screen 3 and a control unit 4. The display screen 3 preferably employs an LCD liquid crystal display. The display surface of display screen 3 is parallel to and faces the mounting surface 11. The control unit 4 is positioned below the display screen 3 and is electrically connected to it, serving to power the display screen 3 and transmit image signals to it. The images from the display screen 3 are projected onto the interior of the hemisphere body 1 through the mounting surface 11. Users can directly observe the images through the outer spherical surface 12.

Specifically, the control unit 4 includes a display control board 41 and a power control board 42, both preferably implemented as PCBA circuit boards. The display control board 41 is mounted parallel to the display screen 3 and fixedly installed on the mounting base 2. The display control board 41 features a display connector 411, while the display screen 3 corresponds with a display interface (not shown in the figure) designed for mating with this display connector 411. The display connector 411 plugs into the display interface of the display screen 3. The display control board 41 supplies power to the display screen 3 via the display connector 411 and the display interface, transmits image signals to the display screen 3, and thereby controls the image display on the screen. Additionally, several control buttons 412 are mounted along the edge of the display control board 41, which are mechanical press modules that generate control electrical signals when pressed. Correspondingly, keyholes 22 are formed in the side wall of the mounting base 2 at positions corresponding to the control buttons 412. Keycaps 23 are installed in the keyholes 22, covering the control buttons 412 to protect them and facilitate user pressing. In this embodiment, three control buttons 412 are provided. Users interact with the display control board 41 by pressing these buttons, causing the display control board 41 to execute different commands. Specifically, the three control buttons 412 function as the master switch for the display screen 3, and the up and down switching function keys, respectively, to achieve interactive functionality. A dust cover 31 is positioned between the display screen 3 and the display control board 41. This dust cover 31 seals the mounting cavity 21 beneath the display screen 3, minimizing dust ingress into the mounting cavity 21 during product use. This ensures the longevity and operational stability of the control unit 4.

The power control board 42 is positioned below the display control board 41 and mounted perpendicular to it. The power control board 42 is electrically connected to the display control board 41 for power distribution and information exchange. The power control board 42 is connected to a battery 5 for energy storage. The power control board 42 manages power distribution from the battery 5 and controls its charge/discharge logic to ensure proper operation and safe usage of the battery 5. The battery 5 is installed within the mounting cavity 21. To securely mount the display control board 41 and power control board 42 within the mounting base 2, two positioning bases 25 are provided inside the mounting cavity 21. These positioning bases 25 are radially opposed to each other. Each positioning base 25 features a vertically oriented positioning hole 252. Correspondingly, the display control board 41 is equipped with two connection holes 413, which are circular in shape. Each connection hole 413 vertically aligns with a corresponding positioning hole 252. By inserting fasteners such as screws through the connection holes 413 and positioning holes 252 and tightening them, the display control board 41 is locked onto the positioning base 25, ensuring its stable positioning. Additionally, each positioning base 25 features a vertically oriented snap-fit groove 251. The openings of these snap-fit grooves 251 face each other. The vertically mounted power control board 42 is inserted between two snap-fit grooves 251. Through the positioning constraints provided by the display control board 41 and the snap-fit grooves 251, the position of the power control board 42 is locked in place.

The lower section of the power control board 42 houses an interface module 421, which connects to the power cord. Once the power cord is connected to the mains power supply, the power control board 42 distributes electrical energy to the battery 5 via circuit logic to charge it. A charging port 24 is formed at the bottom of the mounting base 2, vertically aligned with the interface module 421. Users insert the power cord plug into the charging port 24 to connect it with the interface module 421. Under the control of the circuit logic on the power control board 42, this enables charging of the battery 5.

Additionally, a speaker 6 is installed within the mounting cavity 21. Speaker 6 is connected to the display control board 41, which integrates an audio control chip. This enables the display control board 41 to simultaneously control speaker 6 for audio playback while the display screen 3 shows images or videos, enhancing the product's functionality and practicality. The bottom of the mounting cavity 21 features a matching accommodation slot 26 for the speaker 6, into which the speaker 6 is embedded. Multiple speaker holes 261 are formed in the side walls of the mounting base 2 at the accommodation slot 26. These speaker holes 261 are circular through-holes, arranged in a continuous array corresponding to the speaker 6, ensuring sound emitted by the speaker 6 can propagate through the holes.

The operating principle of the present invention is that when the display control board 41 is energized, it transmits images or videos stored within it to the display screen 3 in the form of electrical signals, enabling the display screen 3 to display the images and videos. Simultaneously, the images or videos displayed on the display screen 3 can be directly projected onto the hemisphere body 1 via the mounting surface 11. By setting specific optical parameters such as curvature and refractive index for the hemisphere body 1, it can be matched with the size and mounting position of the display screen 3. This enables the images from the display screen 3 to be fully projected through the hemisphere body 1, allowing observers to perceive a full-screen enlarged effect through the hemispherical surface. Moreover, the hemispherical structure's optical properties naturally create a 3D visual perception. This achieves the immersive atmosphere of 3D display effects while eliminating the need for additional 3D display modules or magnifying lenses. Its simplified structure and lower cost deliver an enhanced user experience.

The above are merely embodiments of the present disclosure and are not intended to limit the scope of the present disclosure. For those skilled in the art, the present disclosure may be subject to various modifications and variations. Any modifications, equivalent substitutions, improvements, etc., made within the spirit and principles of the present disclosure shall be included within the scope of the appended claims.

What is claimed is:

1. An immersive crystal ball 3D visual projection device, for displaying digital images, comprising:
   a hemisphere body serving as a projection image carrier, featuring a mounting surface and an outer spherical surface;
   a mounting base with a hemispherical hollow shell structure, connecting with the hemisphere body to form a complete sphere;
   wherein the mounting base comprises a mounting cavity housing a display screen and a control unit, with the display screen's viewing surface facing the mounting surface to project images within the hemisphere body, enabling external observers to view the projected images through the outer spherical surface; and the control unit comprises a display control board and a power control board, the display control board is electrically connected to the display screen to transmit image signals to it; the power control board is connected to a battery and is electrically linked to the display control board for power distribution and information exchange; the power control board manages battery power allocation and controls charge/discharge logic.

2. The immersive crystal ball 3D visual projection device according to claim 1, wherein the mounting cavity is provided with a mounting opening, and the edge of the mounting opening is provided with a sealing groove, wherein the sealing groove is used to fill with sealant to seal and bond the hemisphere body and the mounting base.

3. The immersive crystal ball 3D visual projection device according to claim 1, wherein a speaker is installed within the mounting cavity, and the display control board is electrically connected to the speaker, enabling the display control board to transmit audio signals to the speaker; the mounting base is provided with a plurality of speaker holes corresponding to the speaker, allowing sound from the speaker to be transmitted through the speaker holes to the exterior of the mounting cavity.

4. The immersive crystal ball 3D visual projection device according to claim 1, wherein the mounting cavity is provided with a positioning base, the positioning base is formed with a positioning hole, and the display control board is formed with a connecting hole corresponding to the positioning hole, such that after a fastener is inserted through the connecting hole and the positioning hole, the display control board can be locked onto the positioning base.

5. The immersive crystal ball 3D visual projection device according to claim 4, wherein two positioning bases are provided, each featuring a snap-fit groove, and the two snap-fit grooves are arranged oppositely, with the power control board inserted between them.

6. The immersive crystal ball 3D visual projection device according to claim 1, wherein the display control board is equipped with control buttons that generate electrical signals when pressed, enabling users to interact with the display control board via the control buttons; the mounting base is provided with keyholes corresponding to the control buttons, wherein keycaps are installed in the keyholes and connected to the corresponding control buttons.

7. The immersive crystal ball 3D visual projection device according to claim 1, wherein the power control board is provided with an interface module for connecting to a power cord, and the mounting base is provided with a charging port, wherein the interface module corresponds to the charging port.

8. The immersive crystal ball 3D visual projection device according to claim 1, wherein a dust cover is provided between the display screen and the display control board, and the dust cover is configured to seal the mounting cavity.

9. An immersive crystal ball 3D visual projection device, for displaying digital images, comprising:

a hemisphere body and a hemispherical mounting base, which interlock to form a complete sphere; wherein the mounting base features a mounting cavity, and the mounting cavity houses a display screen and a control unit; the display screen receives image signals from the control unit and projects digital images onto the hemisphere body, and the hemisphere body is made of crystal material to refract light passing through them;

a battery installed within the mounting cavity, electrically connected to the control unit to distribute electrical energy and manage charge/discharge logic;

a speaker installed within the mounting cavity, electrically connected to the control unit to transmit audio signals.

10. The immersive crystal ball 3D visual projection device according to claim 9, wherein the control unit comprises a display control board and a power control board, the display control board is electrically connected to the display screen to transmit image signals thereto, while the power control board is electrically connected to the display control board for power distribution and information exchange.

11. The immersive crystal ball 3D visual projection device according to claim 10, wherein a speaker is installed within the mounting cavity, and the display control board is electrically connected to the speaker, enabling the display control board to transmit audio signals to the speaker; the mounting base is provided with a plurality of speaker holes corresponding to the speaker, allowing sound from the speaker to be transmitted through the speaker holes to the exterior of the mounting cavity.

12. The immersive crystal ball 3D visual projection device according to claim 10, wherein the mounting cavity is provided with a positioning base, the positioning base is formed with a positioning hole, and the display control board is formed with a connecting hole corresponding to the positioning hole, such that after a fastener is inserted through the connecting hole and the positioning hole, the display control board can be locked onto the positioning base.

13. The immersive crystal ball 3D visual projection device according to claim 12, wherein two positioning bases are provided, each featuring a snap-fit groove, and the two snap-fit grooves are arranged oppositely, with the power control board inserted between them.

14. The immersive crystal ball 3D visual projection device according to claim 10, wherein the display control board is equipped with control buttons that generate electrical signals when pressed, enabling users to interact with the display control board via the control buttons; the mounting base is provided with keyholes corresponding to the control buttons, wherein keycaps are installed in the keyholes and connected to the corresponding control buttons.

15. The immersive crystal ball 3D visual projection device according to claim 10, wherein the power control board is provided with an interface module for connecting to a power cord, and the mounting base is provided with a charging port, wherein the interface module corresponds to the charging port.

16. The immersive crystal ball 3D visual projection device according to claim 9, wherein the mounting cavity is provided with a mounting opening, and the edge of the mounting opening is provided with a sealing groove, wherein the sealing groove is used to fill with sealant to seal and bond the hemisphere body and the mounting base.

\* \* \* \* \*